United States Patent [19]
Allt et al.

[11] Patent Number: 5,159,675
[45] Date of Patent: Oct. 27, 1992

[54] PERFORMANCE CONTROL MECHANISM FOR ALTERNATELY ALLOWING INSTRUCTIONS TO BE INITIATED FOR R CLOCK BEATS AND PREVENTING INITIATING THEREOF FOR W CLOCK BEATS

[75] Inventors: George Allt, Chadderton; John R. Eaton, Salford, both of Great Britain

[73] Assignee: International Computers Limited, London, England

[21] Appl. No.: 393,418

[22] Filed: Aug. 14, 1989

[30] Foreign Application Priority Data

Aug. 25, 1988 [GB] United Kingdom ............... 8820183

[51] Int. Cl.⁵ .......................................... G06F 9/28
[52] U.S. Cl. ........................... 395/375; 364/DIG. 1; 364/264.5; 364/270.2; 364/271.5; 395/800
[58] Field of Search ... 364/200 MS File, 900 MS File; 395/375

[56] References Cited

U.S. PATENT DOCUMENTS

| | | | |
|---|---|---|---|
| 4,296,465 | 10/1981 | Lemak | 364/200 |
| 4,481,581 | 11/1984 | Johnson | 364/200 |
| 4,745,544 | 5/1988 | Renner et al. | 364/200 |
| 4,908,749 | 3/1990 | Marshall et al. | 364/200 |
| 4,910,671 | 3/1990 | Kitamura et al. | 364/200 |
| 5,051,742 | 9/1991 | Hullett et al. | 340/825.5 |

FOREIGN PATENT DOCUMENTS

0196964 10/1986 European Pat. Off.
58-109937 12/1981 Japan.

*Primary Examiner*—Thomas C. Lee
*Assistant Examiner*—Mehmet Geckil
*Attorney, Agent, or Firm*—Lee, Mann, Smith, McWilliams, Sweeney & Ohlson

[57] ABSTRACT

A data processor is provided with a mechanism for controlling its performance. The processor is allowed to run normally for R clock beats, and then further instruction starts are inhibited for W clock beats. The ratio W/R determines the level of performance of the processor.

3 Claims, 2 Drawing Sheets

PERFORMANCE CONTROL MECHANISM FOR ALTERNATELY ALLOWING INSTRUCTIONS TO BE INITIATED FOR R CLOCK BEATS AND PREVENTING INITIATING THEREOF FOR W CLOCK BEATS

BACKGROUND TO THE INVENTION

This invention relates to data processing apparatus and, more specifically, is concerned with controlling the performance of such apparatus.

It is sometimes required to adjust the performance of a data processing system to a desired level, less than the maximum potential performance of the system. For example, if a user requires only a limited performance system, a manufacturer may offer to supply a higher performance machine, modified so that its performance is reduced, at a lower price than is normally charged for this machine. The advantage to the user is that he gets a machine with the desired performance and price, with the possibility of upgrading the machine at some later date upon payment of an agreed fee to the manufacturer. The advantage to the manufacturer is that he can use a single hardware design to cover a number of different performance levels.

The object of the present invention is to provide a novel way of controlling the performance of data processing apparatus.

SUMMARY OF THE INVENTION

According to the invention, there is provided a data processing apparatus including a performance control circuit for alternately allowing instructions to be initiated for R clock beats and preventing initiation of instructions for W clock beats where R and W are independently controllable parameters.

BRIEF DESCRIPTION OF THE DRAWINGS

One embodiment of the invention will now be described by way of example with reference to the accompanying drawings.

DESCRIPTION OF AN EMBODIMENT OF THE INVENTION

Figure 1:
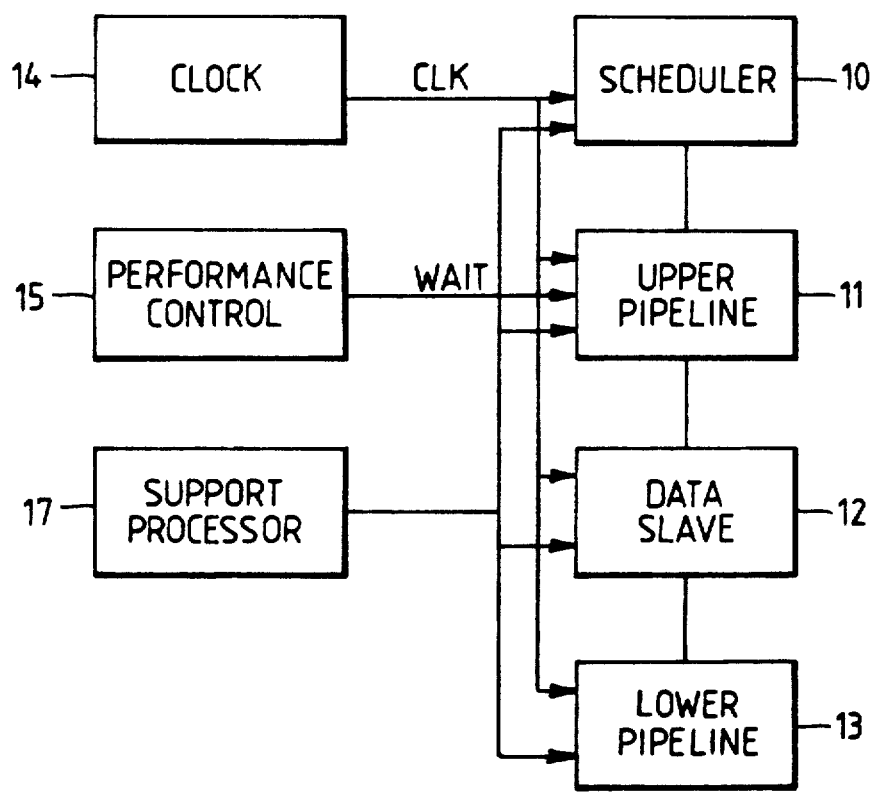
FIG. 1 is a block diagram of a pipelined data processing system.

Referring to FIG. 1, the pipelined data processing system comprises a scheduler 10, an upper pipeline unit 11, a data slave unit 12, and a lower pipeline unit 13.

The scheduler 10 fetches a sequence of instructions, and passes these to the upper pipeline unit 11. The upper pipeline unit decodes the instructions, and forms operand addresses for the instructions. The data slave 12 receives these addresses, and fetches the required operands. The lower pipeline unit 13 receives the operands and performs operations on them as specified by the instructions.

The system is controlled by a clock signal CLK produced by a clock circuit 14.

The upper pipeline unit 11 receives a WAIT signal from a performance control unit 15. When WAIT is false, a new instruction can be initiated in the upper pipeline at each beat of clock CLK, whenever one is available from the scheduler. On the other hand, when WAIT is true, this prevents the initiation of any further instructions in the upper pipeline. However, instructions initiated prior to WAIT becoming true still continue to be processed through the pipeline.

The system also includes a support processor 17 which performs diagnostic tests on the rest of the system, controls error management, and controls initial program load.

Figure 2:
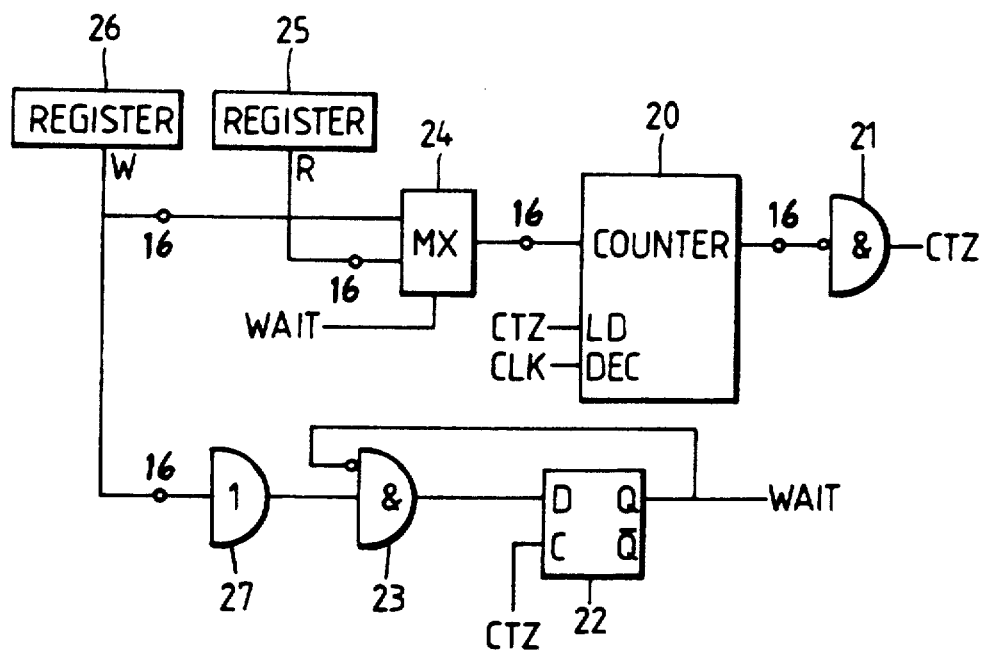
FIG. 2 is a more detailed diagram of a performance control unit forming part of the data processing system.

Referring now to FIG. 2, this shows the performance control unit 15 in detail.

The performance control unit comprises a 16-bit counter 20. The decrement input DEC of this counter receives the clock signal CLK, so that the counter is decremented by one at each beat of CLK. The sixteen bits of the output of the counter are inverted and combined in an AND gate 21 to produce a signal CTZ. This signal, when true, therefore indicates that the count is zero. CTZ is fed to the load control input LD of the counter.

CTZ is also applied to the clock input of a flip-flop (bistable circuit) 22, the output of which is the WAIT signal. WAIT is inverted and fed back to the input of the flip-flop by way of an AND gate 23.

WAIT also controls a two-way multiplexer 24. When WAIT is true, the multiplexer 24 selects the output R from a 16-bit register 25. When WAIT is false, the multiplexer selects the output W from another 16-bit register 26. The output of the multiplexer 24 is fed to the data input of the counter 20. The registers 25, 26 are both loaded by means of firmware in the support processor 17 at initial program load time, or subsequently during diagnostic action.

The sixteen bits of the output W of register 26 are combined in an OR gate 27, and the result is fed to an input of the AND gate 23. Thus, when W is zero, the AND gate 23 is disabled.

The operation of the performance control unit will now be described, for the case where W is non-zero.

The counter 20 is decremented at each beat of clock CLK. When the count reaches zero, CTZ is asserted. Assuming that WAIT is false, CTZ loads the value W into the counter 20 and at the same time clocks the flip-flop 22 so as to make WAIT true.

The counter 20 is then decremented from this initial value W. After W clock beats, the count again reaches zero, and CTZ is asserted. This loads the value R into the counter, and at the same time clocks the flip-flop 22 so as to make WAIT false again.

Thus, it can be seen that the WAIT signal alternately goes true for W clock beats and false for R clock beats. In other words, instructions are prevented from starting in the upper pipeline for W clock beats, and then allowed to start normally for R clock beats.

The performance of the system is determined by the ratio W/R: the higher this ratio, the lower the performance. Thus, for example, the performance can be set to a desired value, by suitable choice of W/R, and the system can then be upgraded at some later date by decreasing this ratio.

It should be noted that W and R are independently controllable parameters. Hence, for a given value of the ratio W/R, the absolute values of W and R can be varied. In practice, the absolute values of W and R can be chosen to be sufficiently large to avoid distortion of the processing as a result of excessively frequent switching between running and waiting, but sufficiently small to prevent waiting times from being critical.

The above description of the operation assumed that W is non-zero. If W is zero, then the AND gate 23 is disabled, preventing the setting of the flip-flop 22. Thus, WAIT is kept false, and the system is allowed to run continuously without any enforced waiting.

We claim:

1. Data processing apparatus comprising:
   (a) a data processing unit,
   (b) clock means coupled to the data processing unit for producing a clock signal for controlling operation of the data processing unit,
   (c) first register means for specifying a run parameter R and second register means for specifying a wait parameter W, and
   (d) performance control means, coupled to the clock means, to said first and second register means and to the data processing unit, for alternately allowing instructions to be initiated in the data processing unit for R clock beats, and preventing initiating of instructions for W clock beats,
   wherein said performance control means comprises:
   (1) means for producing a WAIT signal,
   (2) a counter having a decrement control input connected to receive said clock signal, to decrement the counter at each beat of the clock signal,
   (3) means operative when the counter reaches a predetermined value when the WAIT signal is true, for loading the parameter R into the counter and setting the WAIT signal false,
   (4) means operative when the counter reaches a said predetermined value when the WAIT signal is false, for loading the parameter W into the counter and setting the WAIT signal true, and
   (5) means for applying said WAIT signal to the data processing means, to prevent initiation of instructions when the WAIT signal is true.

2. Apparatus according to claim 1, wherein the data processing unit comprises a plurality of data processing stages, connected together in series to form a data processing pipeline.

3. Apparatus according to claim 2 wherein, said performance control means includes means for preventing initiation of instructions in one of said data processing stages while allowing instructions already initiated in subsequent stages of the data processing pipeline to continue to be processed.

* * * * *